United States Patent Office 2,919,963
Patented Jan. 5, 1960

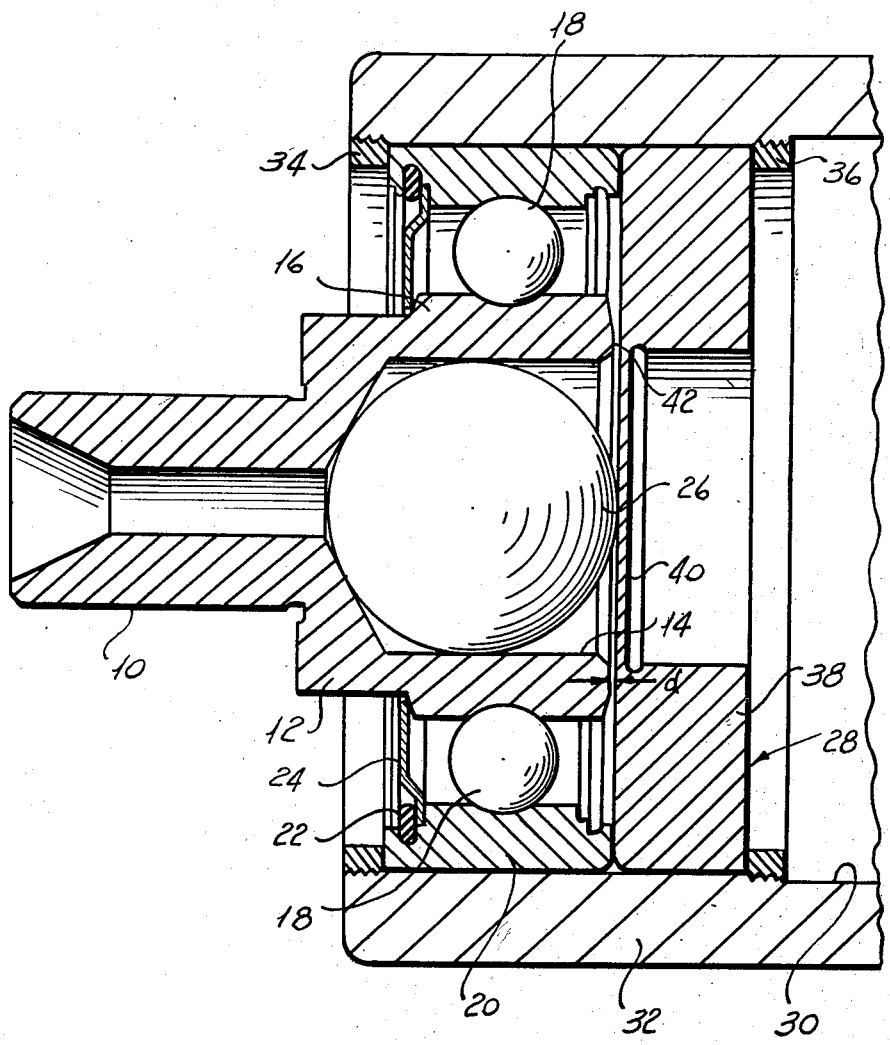

2,919,963

THRUST-SHOCK-PROTECTED LOW-TORQUE RADIAL BALL BEARING

Bruce L. Mims, Danbury, Conn., assignor to The Barden Corporation, Danbury, Conn., a corporation of Connecticut Application June 18, 1956, Serial No. 592,133

7 Claims. (Cl. 308—219)

My invention relates to a thrust-shock-protected, low-torque, radial ball bearing and more particularly to a ball bearing which offers only a low torsional resistance to rotation and which is protected against damage which might result from thrust shocks.

Many installations require a bearing which offers a low torsional resistance to rotation in supporting a load in normal operation. At the same time it is necessary that the bearing be substantially rigid in a radial and in an axial direction. Instruments used in guided missiles and jet propelled aircraft require bearings having these characteristics. It will be appreciated that a large thrust shock or "setback" is incident to the firing of a guided missile. A large thrust shock also results from the reaction thrust of jet propelled aircraft. Bearings for use in installations in which such large thrust shocks occur must be protected against permanent damage resulting from shock loads.

A bearing of the ball type best fulfills the requirements outlined above. In normal operation of ball bearings a certain amount of sliding friction exists. If a shock load occurs while a bearing is running, it is distributed around the entire surface of the rotating raceway to increase the torsional resistance to rotation offered by the bearing. Since the smallest ball bearings have the least area of contact between the balls and the rotating race, they normally have the lowest torsional restraint. Owing to their small size, however, they also are the most easily damaged bearings.

One suggested solution to the problem of providing a bearing which will absorb a high thrust has been to remove one land of a race of the bearings to give a structure including a large number of balls and a strong unitary retainer. While this construction will carry high radial and unidirectional thrust loads, it increases the frictional resistance of the assembly to require a relatively high driving torque.

I have invented a thrust-shock-protected, low-torque, radial ball bearing which requires only a low driving torque and which is protected against permanent damage from thrust shocks owing to sudden accelerations of the bearing mounting. My bearing is substantially rigid in a radial and in an axial direction.

One object of my invention is to provide a ball bearing which requires only a low driving torque in normal operation.

Another object of my invention is to provide a ball bearing which is protected against permanent damage resulting from thrust-shock loads applied to the bearing.

A further object of my invention is to provide a ball bearing which is substantially rigid in a radial and in an axial direction in normal operation.

Other and further objects of my invention will appear from the following description:

In general my invention contemplates the provision of a ball bearing including a shaft having an end carrying the inner bearing race for rotation with the shaft. I dispose balls between the inner race and the outer bearing race to permit relative rotation between the races. I position a thrust ball in a recess formed in the shaft end. My bearing includes a thrust absorbing member formed with a central resilient diaphragm contacting the thrust ball to provide a predetermined clearance between the shaft end carrying the inner races and the body of the thrust absorbing member.

In the accompanying drawings which forms part of the instant specification and which should be read in conjunction therewith:

The figure is a sectional view of my thrust-shock-protected, low-torque, radial ball bearing.

More particularly referring now to the figure, my bearing includes a shaft 10 having a cylindrical enlargement 12 providing a recess 14 in the shaft 10. I form the inner bearing ring 16 integrally with shaft 10 to increase the shaft strength and to improve the over-all accuracy of the bearing. Balls 18 disposed between the inner race 16 and an outer bearing race ring 20 permit relative rotation of shaft 10 with respect to the ring 20. A snap ring 22 or the like retains a cover plate 24 on the outer ring 20 to prevent dirt from entering the space between the bearing race rings.

As will be explained hereinafter, in normal operation of my bearing, the assembly including race rings 16 and 20 and balls 18 is unloaded and for this reason contributes little frictional resistance to the total frictional resistance which must be overcome to drive the bearing. The assembly including race rings 16 and 20 and balls 18 requires only a low driving torque. It would not by itself, however, absorb heavy thrust shocks without permanent damage. I position a thrust ball 26 in the recess 14 formed in the end of shaft 10. I mount a thrust absorbing member indicated generally by the reference character 28 in fixed relationship with the outer race ring 20. This may be accomplished by any convenient means. For example, I may dispose the outer race ring 20 and the member 28 in the bore 30 of a mounting member 32. Rings 34 and 36 may be screwed into the bore 30 to retain ring 20 and member 28 in position within bore 30.

Member 28 includes a body 38 and a central resilient diaphragm 40. The relative dimensions of the shaft portion 12, inner race ring 16, outer race ring 20, and ball 26 are such that, in the assembled condition of my bearing, ball 26 makes contact with diaphragm 40 while a predetermined clearance "d" is left between the annular face 42 of the shaft end and the thrust absorbing body 38.

It will be appreciated that the least frictional resistance between two members results when the members make point contact, as, for example, when a ball makes point contact with a member having a flat surface. In normal operation of my bearing the arrangement is such that ball 26 makes substantially point contact with diaphragm 40. In this condition it offers very little torsional restraint to the relative movement between shaft 10 and ring 20. As a result, my bearing requires only a low driving torque.

In normal operation of my bearing the load supported by the bearing causes the diaphragm 40 to flex very slightly to its operating position. In this position very little torsional restraint results from the friction between ball 26 and diaphragm 40. In this condition of my bearing the assembly including race rings 16 and 20 and balls 18 is substantially unloaded with the result that it contributes little friction to the total in the bearing. As a result only a low torque is required to drive the bearing. Upon the occurrence of a thrust-shock, ball 26 flexes the diaphragm 40 to permit face 42 to contact the body 38 of the thrust absorbing member 28. When face 42 engages the body 38 the bearing is momentarily inoperative torsionally. I calculate the clearance "d" to permit face 42 to engage body 38 before damage is done to the assembly including rings 16 and 20 and balls 18. It is to be understood that the deflection of diaphragm 40 as the shaft moves through the distance "d" is within the elastic limit of material of which the member 28 is formed. There is no permanent deformation of diaphragm 40 after a deflection. The stress at the contact area between diaphragm 40 and ball 26 as well as the maximum load which this contact area can withstand without permanent alteration may be calculated in a manner known to the art. High shock loads in a radial direction are resisted by the assembly including rings 16 and 20 and balls 18 without damage to the assembly. These radial shock loads do not affect ball 26 and diaphragm 40. The assembly including race rings 16 and 20 and balls 18 lends radial rigidity to my bearing while ball 26 and diaphragm 40 lend axial rigidity in normal operation of the bearing.

It will be seen that I have accomplished the objects of my invention. I have provided a ball bearing which requires only a low driving torque. My bearing is protected against permanent damage owing to thrust-shock loads. It is substantially rigid in a radial and in an axial direction in normal operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A thrust-shock-protected low-torque radial ball bearing including in combination a shaft having an end, an inner race carried by said shaft for rotation therewith, an outer race, balls disposed between said inner race and said outer race to permit relative rotation therebetween, a thrust absorbing member mounted in fixed relationship with said outer race, and means responsive to shaft thrust to permit said shaft end to engage said thrust absorbing member.

2. A thrust-shock-protected low-torque radial ball bearing including in combination a shaft having an end, an inner race carried by said shaft for rotation therewith, an outer race, balls disposed between said inner race and said outer race to permit relative rotation therebetween, a recess formed in said shaft end, a thrust ball disposed in said recess, and a thrust absorbing member mounted in fixed relationship with said outer race, said thrust ball contacting said thrust absorbing member.

3. A thrust-shock-protected low-torque radial ball bearing including in combination a shaft having an end, an inner race carried by said shaft for rotation therewith, an outer race, balls disposed between said inner race and said outer race to permit relative rotation therebetween, a recess formed in said shaft end, a thrust ball disposed in said recess, and a thrust absorbing member mounted in fixed relationship with said outer race with a predetermined clearance between the thrust absorbing member and the shaft end, said thrust ball contacting said thrust absorbing member.

4. A ball bearing as in claim 3 in which said thrust absorbing member includes a body and a resilient member, said thrust ball normally contacting said member, said member adapted to yield to permit said shaft end to engage said body.

5. A ball bearing as in claim 3 in which said inner race is formed integrally with said shaft.

6. A thrust-shock-protected low-torque radial ball bearing including in combination a shaft having an end, an inner race carried by said shaft for rotation therewith, an outer race, balls disposed between said inner race and said outer race to permit relative rotation therebetween, a stationary thrust-shock absorbing member and means including a thrust ball for normally maintaining said shaft end and said thrust absorbing member in spaced relationship.

7. A thrust-shock-protected low-torque radial ball bearing as in claim 6 in which said thrust absorbing member includes a resilient diaphragm, said thrust ball being disposed between and in engagement with said shaft end and said diaphragm.

References Cited in the file of this patent

UNITED STATES PATENTS

| | | |
|---|---|---|
| 293,619 | Bishop | Feb. 19, 1884 |
| 2,155,657 | Hellyar | Apr. 25, 1939 |
| 2,175,047 | Acker | Oct. 3, 1939 |
| 2,334,002 | Heintz et al. | Nov. 9, 1943 |
| 2,351,890 | Turner | June 20, 1944 |
| 2,352,911 | Osplack | July 4, 1944 |
| 2,529,231 | Smith | Nov. 7, 1950 |

FOREIGN PATENTS

| | | |
|---|---|---|
| 918,063 | Germany | Sept. 16, 1954 |